United States Patent
Masuda et al.

[15] 3,649,936
[45] Mar. 14, 1972

[54] TEMPERATURE SWITCH

[72] Inventors: Mitsuo Masuda; Nobuyoshi Ota, both of Kariya, Japan

[73] Assignee: Nippondenso Kabushiki Kaisha, Kariyashi, Japan

[22] Filed: July 9, 1970

[21] Appl. No.: 53,515

[30] Foreign Application Priority Data

July 14, 1969 Japan..............................44/67048
Mar. 5, 1970 Japan..............................45/21623

[52] U.S. Cl................................................335/208
[51] Int. Cl.................................................H01h 61/02
[58] Field of Search.............................335/146, 208

[56] References Cited

UNITED STATES PATENTS 3,295,081  12/1966  Bowyer et al.....................335/208

FOREIGN PATENTS OR APPLICATIONS 1,549,349  11/1968  France...............................335/146

*Primary Examiner*—Bernard A. Gilheany
*Assistant Examiner*—R. N. Envall, Jr.
*Attorney*—Cushman, Darby & Cushman

[57] ABSTRACT

A temperature switch in which a reed switch connected to an alarming device is disposed in a magnetic circuit of a permanent magnet and two parts or pieces of magnetic substances having different magnetic transition points are magnetically arranged in series with the permanent magnet, thereby the alarming device being actuated by switching on and off the reed switch in accordance with the change in the permeability of the parts of magnetic substance with respect to the temperature variation and thus abnormal rise and drop of the of objects to be measured can be directly detected.

1 Claims, 9 Drawing Figures

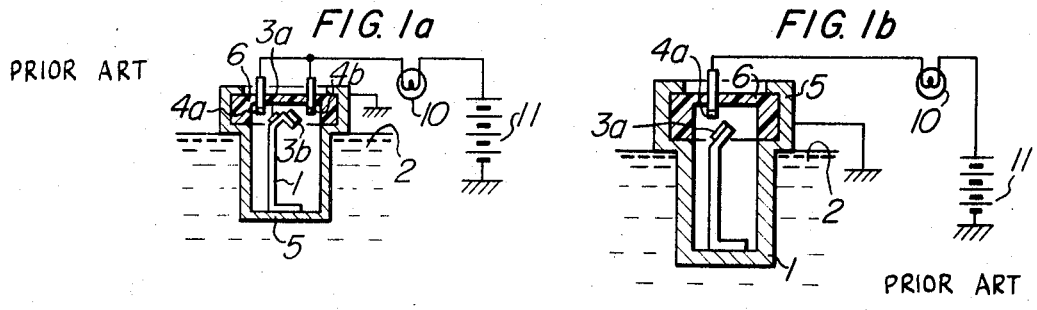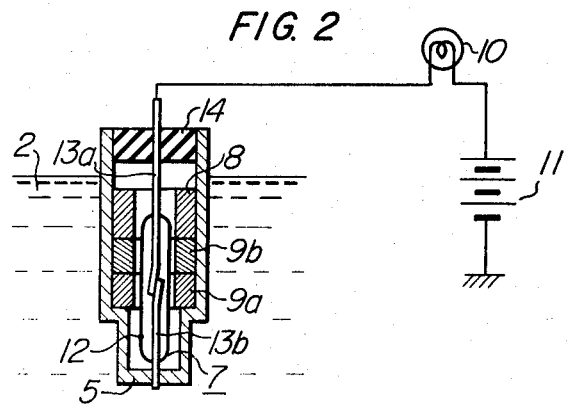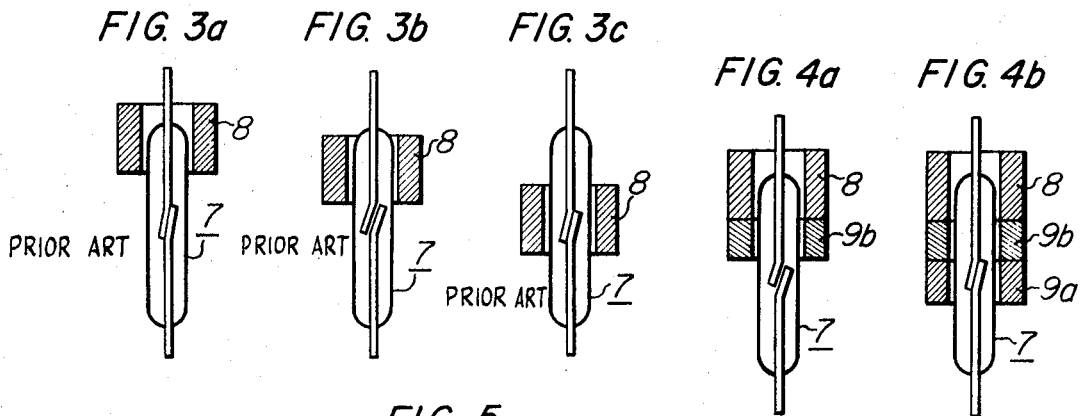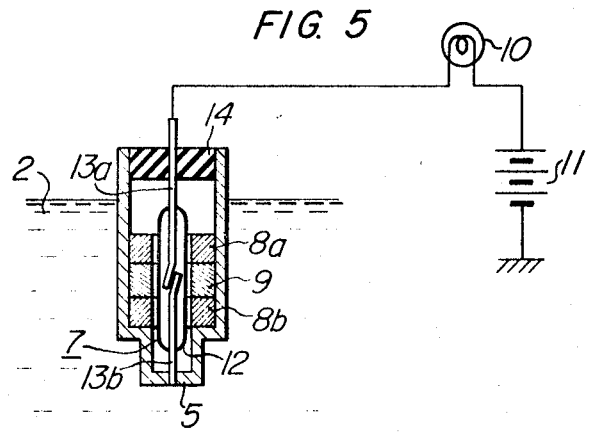

3,649,936

TEMPERATURE SWITCH

BACKGROUND OF THE INVENTION

In conventionally well known devices that have been widely employed as temperature alarming devices for detecting abnormal rise or drop of the temperature of objects to be measured, such as water, oil or the like, for example, the cooling water for internal combustion engines, bimetals have been mainly employed. In such devices, when the temperature of the objects to be measured is higher or lower than the predetermined values the alarming device connected to an electrical circuit is actuated as the bimetal makes in contact with a fixed contact due to its bending displacement at the predetermined temperature and closes the circuit.

However, since in such switches that employs the bimetal has not been obtained sufficient contact pressure between the contacts, there have been some drawbacks that an unsatisfactory contact and a misoperation are easily caused due to the vibration or the other reasons and that the contacts thereof are subjected to the contamination and corrosion, and furthermore, that the thermal responsibility with respect to the temperature is relatively slow.

There will be described an embodiment of the conventionally well known temperature switch in which employed a bimetal, as well as an embodiment of the temperature switch related to the present invention, in "Description of the Preferred Embodiments" hereunder:

The temperature switch according to the present invention employs a reed switch in lieu of the bimetal for the temperature detection and the reed switch is so disposed as to switch on and off the electrical circuit thereof by means of a permanent magnet and two parts of magnetic substance having different magnetic transition points magnetically arranged in series with said permanent magnet, so that all the drawbacks in the temperature switch employing the bimetal are eliminated.

SUMMARY OF THE INVENTION

The present invention relates to a temperature switch for detecting that the temperature of objects to be measured, such as water, oil or the like, for an example, cooling water for automobile engines becomes abnormally higher or lower, in which a reed switch connected to an alarming device is disposed in a magnetic circuit of a permanent magnet and two parts or pieces of magnetic substances having different magnetic transition points are magnetically arranged in series with the permanent magnet thereby the alarming device being actuated by switching on and off the reed switch in accordance with the change in the permeability of the two parts of magnetic substances with respect to the temperature variation so as to detect abnormal rise and drop of the temperature.

In the present invention the reed switch is switched on and off by utilizing the characteristic such that magnetic substances abruptly loses the magnetic permeability when the temperature thereof approaches their magnetic transition points, whereby there can be obtained the temperature switch that performs a positive switching operation and has a better contact pressure compared with a conventional switch employing a bimetal.

The present invention is, therefore, to provide a temperature switch that causes no misoperation or unsatisfactory contact even under the vibration or the other reasons.

In addition, the present invention is to provide a temperature switch in which switch contacts are not corroded by external atmosphere and have an excellent durability as a reed switch having leads enclosed in the glass tube is employed.

Furthermore, the present invention is to provide a temperature switch that has a quick thermal responsibility as compared with a conventional bimetal type as a reed switch is switched on and off by utilizing the abrupt change in the permeability of the part of magnetic substance.

BRIEF DESCRIPTION OF THE DRAWINGS

FIG. 1a is a cross-sectional view showing an example of a conventional temperature switch.

FIG. 1b is a cross-sectional view showing another example of the conventional temperature switch.

FIG. 2 is a cross-sectional view showing an embodiment of a temperature switch according to the present invention.

FIGS. 3a, 3b and 3c are illustrative views showing an operational principle of a lead switch.

FIGS. 4a and 4b are illustrative views of the operation of the temperature switch according to the present invention shown in FIG. 2, and FIG. 5 is a cross-sectional view showing another embodiment of the temperature switch, and the same reference numerals in respective drawings designate the corresponding or equivalent parts.

DESCRIPTION OF THE PREFERRED EMBODIMENTS

There will be initially described in FIGS. 1a and 1b an embodiment of a conventionally well known type of switch that is applied, for an example, to the engine cooling water. In FIG. 1a, in case that the engine cooling water 2 is unsuitable for an automobile travelling due to too low temperature thereof, a bimetal 1 provided within a container 5 protruding into the cooling water 2 makes a contact 3a mounted on a tip end portion thereof in contact with a fixed contact 4a due to the bending displacement of the bimetal and puts on a warning lamp 10. On the contrary, in case that the engine is liable to overheat due to too high temperature of the engine cooling water 2, the bimetal makes a contact 3b separately provided from the contact 3a in contact with a fixed contact 4b disposed oppositely to the fixed contact 4a due to the bending displacement of the bimetal in a direction opposite to the former case and puts on the warning lamp similarly to the former case.

Additionally, the switch shown in FIG. 1b is disposed to detect either one case of abnormal rise or drop of the cooling water 2 by means of the bimetal 1 and puts on the warning lamp 10.

However, in the switches described above, since a sufficient contact pressure between the contacts is not obtained by only the displacement of the bimetal 1 due to the temperature, there are some drawbacks that the misoperation is caused due to the vibration of automobile and the unsatisfactory contact is caused due to the superficial corrosion under harmful gases derived from a packing 6 because the contacts 3a, 3b, 4a and 4b are exposed within the container 5, and furthermore, the thermal responsibility is relatively low.

Accordingly, the present invention has an object to provide the temperature switch in which in order to eliminate the above-mentioned drawbacks, a reed switch connected to the alarming device is disposed in the magnetic circuit of the permanent magnet and two parts of magnetic substances having different transition points are magnetically arranged in series with said permanent magnet, thereby the reed switch is switched on and off by the change in the permeability of said two parts magnetic substances with respect to the temperature variation and this switch has the sufficient contact pressure, the high reliability and durability and further the quick responsibility.

Referring now to FIGS. 3a, 3b and 3c there will be described an operational principle of a well known reed switch. In FIG. 3a, an axially magnetized magnet 8 is positioned adjacent to a portion of the reed switch 7, and in this case only one reed of a pair of reeds of the reed switch 7 is magnetized and the reed switch 7 is closed (This position will be referred as "the first closing position" hereinafter). Then, when the magnet 8 is positioned in a certain region of one reed as shown in FIG. 3b, in this case a pair of reeds are magnetized into the same polarity and the reed switch 7 is opened (This position will be referred as "the opening position" hereinafter). Furthermore, when the magnet 8 is positioned at the middle position over the whole of the reed switch 7 as shown in FIG. 3c, in this case a magnetic flux passes through a pair of reeds and the reed switch 7 is closed (This position will be referred as "the second closing position" hereinafter).

Referring now to FIG. 2 showing an embodiment of the present invention, reference numeral 7 designates a reed switch connected through a warning lamp 10 to a source of electricity 11, and the reed switch is composed by normally enclosing a pair of members of magnetic substance, namely, reeds 13a, 13b in a glass tube 12. Reference numeral 8 designates an annular permanent magnet axially magnetized and this is disposed adjacent to the position corresponding to FIG. 3a around the reed switch 7, namely, adjacent to the first closing position, and 9a, 9b two annular pieces of magnetic substance formed of materials having different magnetic transition points such as for example, thermoferrites, and each being disposed magnetically in series with the permanent magnet 8 and on the opening position and the second closing position respectively, and the magnetic transition of the two parts 9a, 9b different from each other.

One part 9a has a magnetic transition point of the temperature at which the cooling water 2 just becomes of the optimum temperature from of the abnormally low temperature and the other part 9b has that at which the cooling water 2 just becomes of the abnormally high temperature from of the optimum temperature.

Reference numeral 5 designates a container formed of an excellent thermionic conductive, nonmagnetic material such as, for example, brass, aluminum or the like, and 14 an insulating cover for preventing the invasion of water, dust or the like into the interior of the container from the exterior side and serving to electrically insulate the reed 13a of the reed switch 7 from the container 5 and to secure the reed switch 7.

Then, there will be described the operation of the switch of the present invention by way of the embodiment shown in FIG. 2. When the temperature of the engine cooling water 2 is within the proper range, the magnetic substance 9a loses the function as magnetic substance because it exceeds its magnetic transition point and is placed in the state as shown in FIG. 4a as viewed from the point of magnetic circuit view, and said state corresponds to FIG. 3b described previously, thus the warning lamp 10 puts out.

Next, when the temperature of the engine cooling water 2 lowers down and the magnetic substance 9a approaches the magnetic transition point so that the magnetic permeability of the substance 9a rises abruptly up and gets the function as magnetic substance and is placed in the state shown in FIG. 4b as viewed from the point of magnetic circuit view, and said state corresponds to the state shown in FIG. 3c described previously, thus the reed switch 7 being closed and the warning lamp 10 being put on for noticing the abnormal temperature of the cooling water to a driver.

In addition, when the temperature of the cooling water 2 rises up and approaches the magnetic transition point of the other of magnetic substance 9b, the permeability of the magnetic substance 9b lowers abruptly down and loses the function as magnetic substance so that both of the two parts of magnetic substances 9a, 9b have no function as magnetic substance and this corresponds to FIG. 3a described previously as viewed from the point of magnetic circuit view, thus the warning lamp 10 being put on for noticing the abnormal temperature of the cooling water to a driver.

Moreover, although in the embodiment in FIG. 2 the temperature switch is disposed to give the alarm by detecting both the abnormal high and low temperatures, it can of course be disposed to detect either abnormal high or low temperature by constituting the switch with either of the piece of magnetic substance 9a or 9b. Additionally, although in the embodiment described above the warning lamp 10 is employed for the alarming purpose, the alarming device such as a buzzer and an individually controlled device can of course be employed.

In addition, according to the experiment conducted by the present inventor, the temperature switch composed of 20 mm. long of the reed switch 7, 7 mm. thick of the permanent magnet 8, 8 mm. of outer diameter and 4 mm. of inner diameter thereof and 5 mm. thick of the magnetic substances 9a, 9b achieved excellent operation.

In FIG. 5 another embodiment of the switch is illustrated. In this case two annular permanent magnets 8a, 8b magnetized axially into the same polarity are separately located on one opening position and the other opening position being symmetrical with respect to said position about the reed contact, and one annular piece of magnetic substance 9 having a magnetic transition point is magnetically disposed in series with and between said two permanent magnets 8a and 8b and is located on the approximate center of the reed switch 7. Reference numeral 5 designates a container, and 14 an insulating cover.

There will be described the operation of another embodiment of the temperature switch shown in FIG. 5 hereinafter. When the temperature of the engine cooling water 2 is too low and the magnetic substance 9 is of its temperature below the magnetic transition point, the permanent magnets 8a, 8b and the magnetic substance 9 are constituted in one magnet and in result such magnet comes to be arranged on the second closing position so that the reed switch is closed and the warning lamp 10 is put on, thus the abnormal low temperature of the cooling water being noticed to a driver.

When the temperature of the engine cooling water rises up and approaches the magnetic transition point of the magnetic substance 9, the substance 9 loses the function as magnetic substance due to the abrupt drop of the magnetic permeability thereof and this state corresponds to such state that the permanent magnets 8a, 8b are located on the opening position so that the reed switch 7 is opened and consequently the warning lamp 10 is put on.

As described previously, it is experimentally demonstrated that the operation of the reed switch is made more reliable by symmetrically arranging the permanent magnets respectively with respect to the reed contact.

In the present invention as described in the above, there is provided the temperature switch in which a permanent magnet and two parts of magnetic substances having different magnetic transition points are disposed magnetically in series with each other and suitably arranged on the first closing position, the second closing position and the opening position, thereby the reed switch is switched on and off due to the change in the magnetic permeability of said magnetic substances derived from the abnormal temperature rise and drop of the objects to be measured, and thus the abnormally high and low temperature can be detected.

Additionally, according to the temperature switch of the present invention, there can be obtained better contact pressure compared with the conventional temperature switch employing a bimetal and is completely eliminated the problem that the contact is corroded by the external harmful atmosphere as the reed switch encloses the reeds within the glass tube thereof so that the service life of the contacts are made very long, and further the thermal responsibility of the switch is made very quick.

As may be understood from the foregoing description various modifications of the embodiments may be easily conceived without deviating from the spirit of the invention and it is to be understood that such variations and modifications should be included in the scope of the present invention.

What is claimed is:

1. A temperature switch comprising:
   a reed switch (7) having first and second closing positions and an opening position,
   a permanent magnet (8) and,
   two pieces (9a, 9b) of magnetic substances having two different magnetic transition points,
   said permanent magnet and said two pieces of magnetic substances being arranged in series with each other so that said permanent magnet is positioned on the first closing position of said reed switch, the one piece (9a) having the lower magnetic transition point being positioned on the second closing position of said switch and the other piece (9b) being positioned on the opening position of said reed switch to cause said reed switch to be switchable on and off at two different temperatures substantially corresponding to said different magnetic transition points of said two pieces of magnetic substances.

* * * * *